Sept. 10, 1940.    J. S. CLAPPER    2,214,162
CENTER DRIVE TAKE-OFF MOWER
Filed Aug. 29, 1938    5 Sheets—Sheet 5
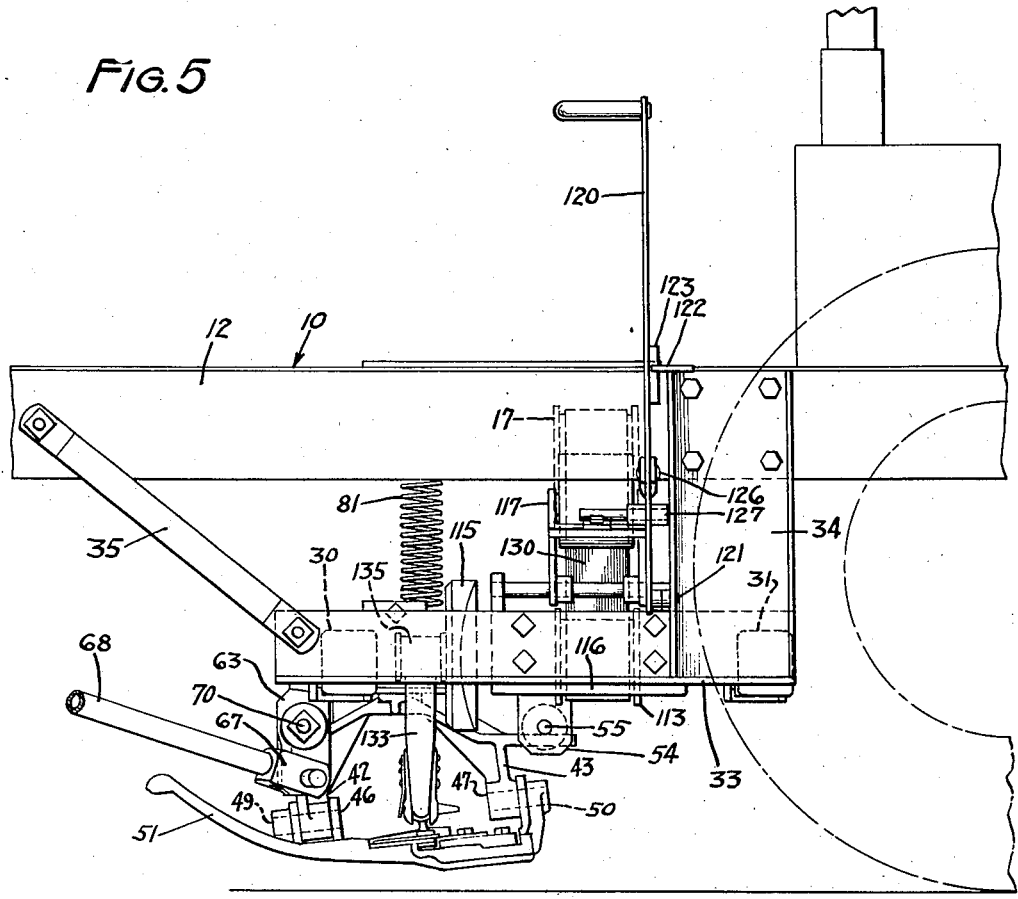
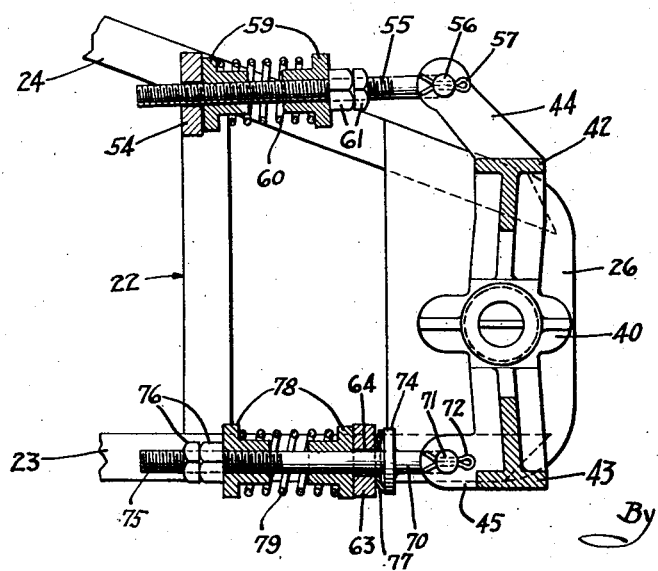

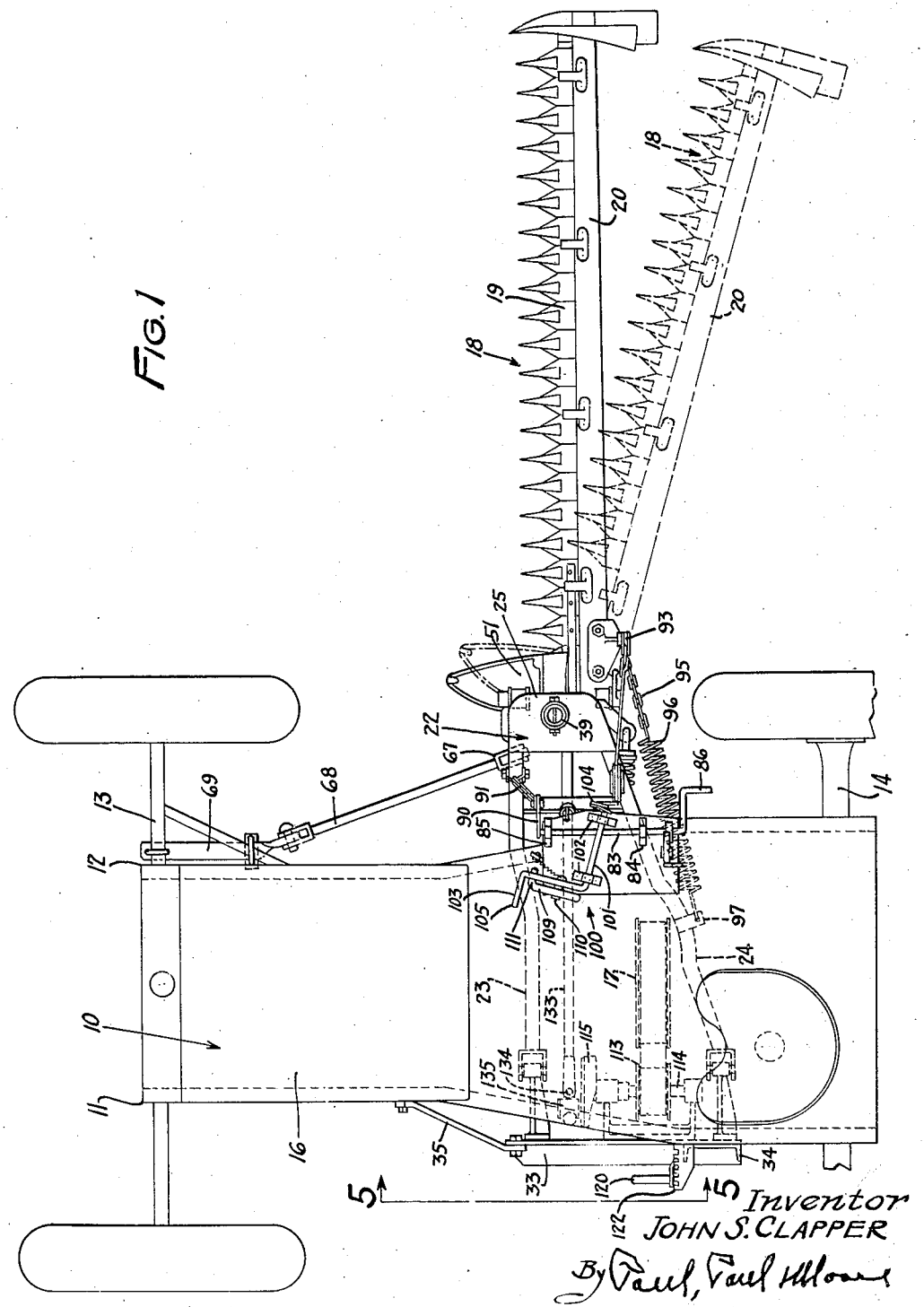

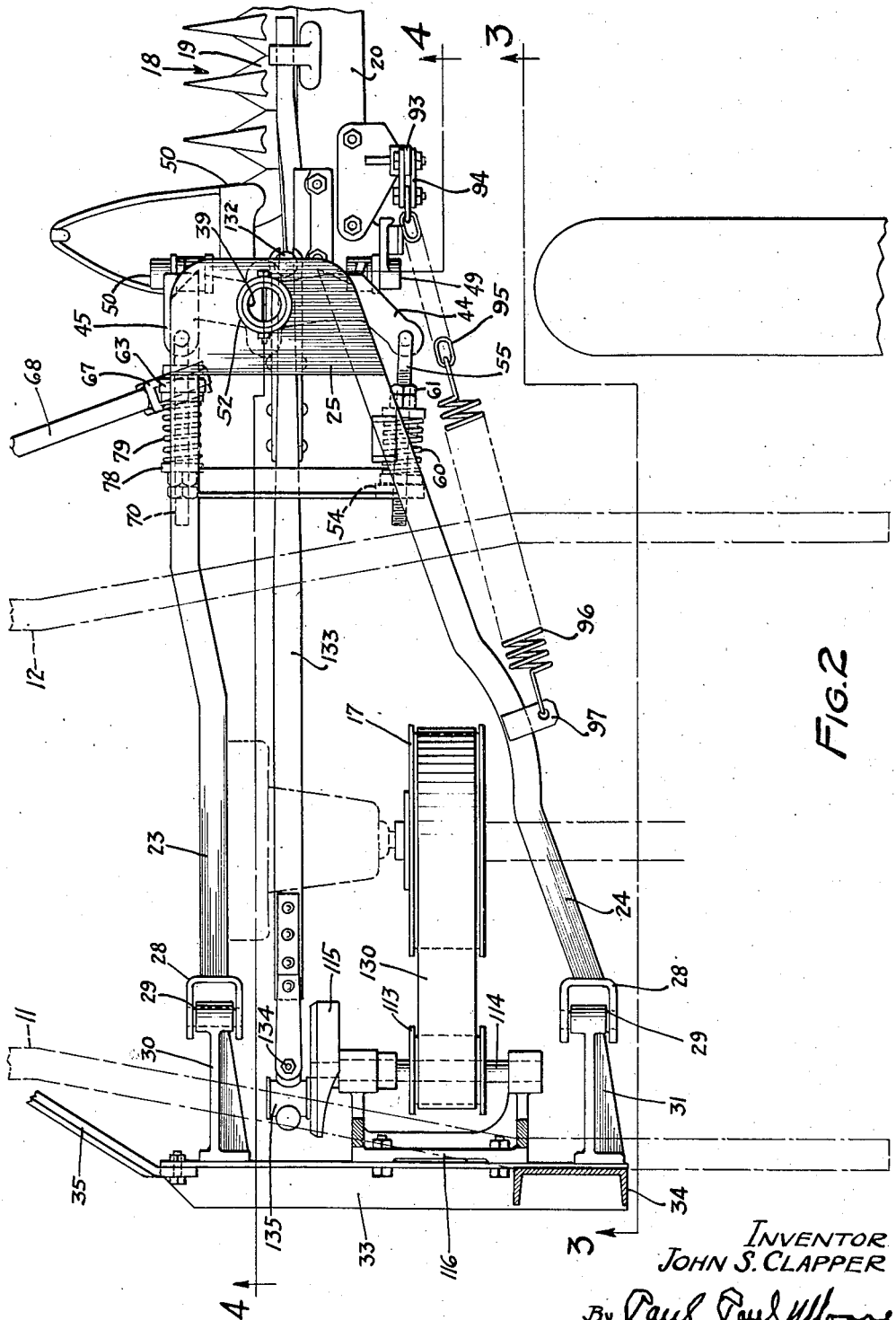

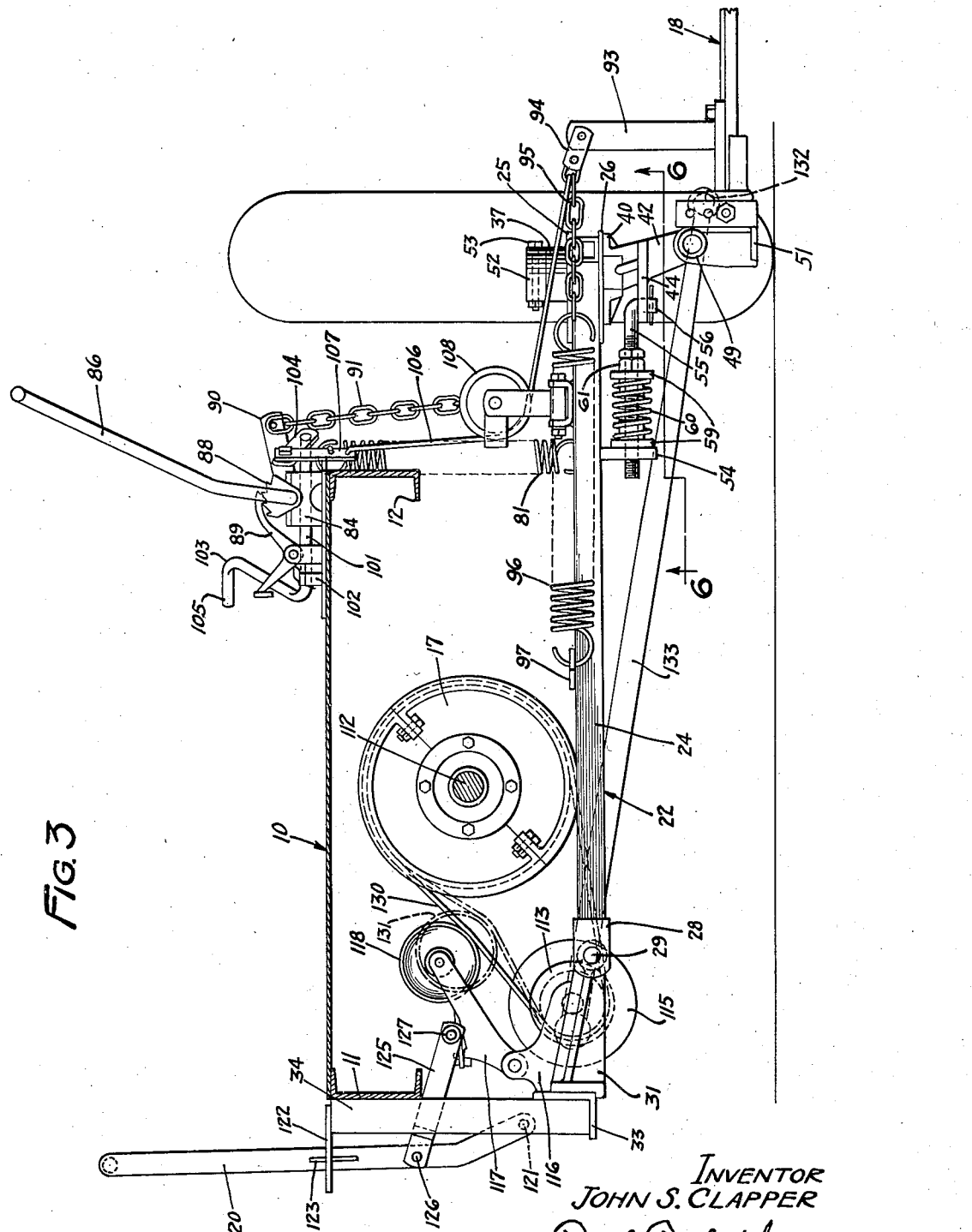

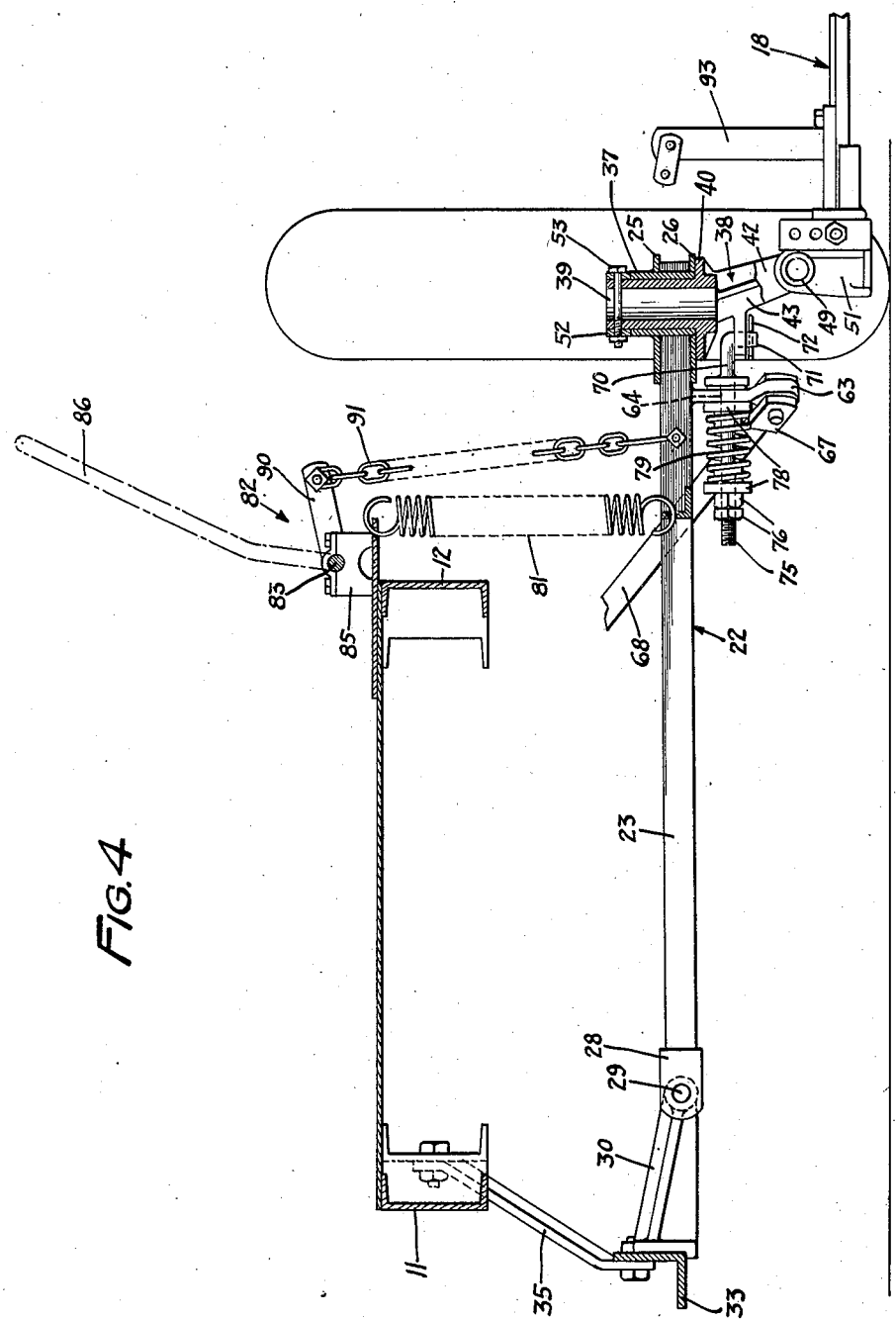

Patented Sept. 10, 1940

2,214,162

UNITED STATES PATENT OFFICE 2,214,162

CENTER DRIVE TAKE-OFF MOWER

John S. Clapper, Minneapolis, Minn., assignor to Toro Manufacturing Corporation of Minnesota, Minneapolis, Minn., a corporation of Minnesota Application August 29, 1938, Serial No. 227,329

10 Claims. (Cl. 56—25)

The present invention relates to motor driven mowing machines of the type in which the sickle bar is carried by a traction vehicle and driven from the same power source which serves to propel the vehicle. Such power driven mowing machines are operated at relatively high speeds, as compared with horse drawn mowers, and the reserve driving power which is capable of maintaining the speed of the machine under difficult cutting conditions is much greater than the reserve power of animals.

These conditions combine greatly to enhance the cutting capacity of the machine as compared with horse drawn mowers but they also introduce the difficulty that the cutting bar of the machine is more likely to be damaged when it hits a solid obstruction such as a boulder or stump. It is an object of the present invention to provide a mowing machine of the motor driven type in which provision is made for reducing the possibility of damage and breakage.

It is a further object of the invention to provide a motor driven mowing machine having a yieldingly mounted sickle bar.

It is a specific object of the invention to provide a motor driven mowing machine having a sickle bar pivotally mounted about a vertical axis and yieldable means for maintaining the bar in cutting position.

It is also an object of the invention to provide a mowing machine in which the cutter bar is pivoted adjacent the pitman connection to the cutter knife.

In the use of the moving machine of the present invention the cutter bar yields when it hits an obstruction and while yielding permits a time interval sufficient for the operator to act to relieve the mechanism, and it is a further object of the invention to provide in combination, an operator-controlled cutter bar lift by which the bar may be expeditiously lifted, to clear the obstruction.

It is also an object of the invention to provide a lifting mechanism for the cutter bar which is operable throughout its full range of movement by a single stroke of a foot or hand lever.

It is a further object of the invention to provide a regulating means by which the cutting level of the mower may be changed at will.

Other and further objects of the invention are those inherent in the apparatus described, illustrated and claimed herein.

The apparatus is illustrated in the drawings in which

Figure 1 is a fragmentary plan view of a traction vehicle showing the mowing apparatus in the normal position and also in the position assumed when an obstruction is encountered.

Figure 2 is an enlarged fragmentary plan view, partly in section showing the mounting connections and operating drive of the cutter bar.

Figure 3 is a cross-sectional view in elevation as viewed in the forward direction along the line 3—3 of Figure 2.

Figure 4 is a cross-sectional view in elevation as viewed in the forward direction along the line 4—4 of Figure 2.

Figure 5 is a partial side view in elevation in the direction of arrows 5—5 of Figure 1.

Figure 6 is a fragmentary detail partly in section showing the yieldable pivotal cutter bar connection as viewed from the under side, in the direction of arrows 6—6 of Figure 3.

Throughout the drawings like parts are indicated by the same numerals.

The mowing machine of the present invention comprises a traction vehicle generally designated 10, having a frame composed of side members 11 and 12, a front axle 13 and a rear axle 14. This traction vehicle is similar to an automobile chassis except that the wheel base is somewhat less than ordinarily used for automotive purposes and the chassis is stripped of all except functional mechanisms. A motor is provided at the forward end of the chassis and is housed in compartment 16 and serves to drive the vehicle and also to provide power for driving pulley 17 of the mower actuating apparatus.

The mowing apparatus is mounted midway between the front and rear axles as shown in Figure 1, and comprises a mowing implement generally designated 18, having a reciprocating sickle 19 and a main cutter bar 20. The mowing implement is of well known type and per se is not a part of the invention.

The mowing implement is carried by a mounting frame generally designated 22 consisting of mounting bars 23 and 24 which are connected at one end by means of a pair of spaced plates 25 and 26, as shown in Figure 4. The plates are welded to the mounting bars and hold the bars in a V-shaped configuration as shown in Figure 1.

At the left end of each of the bars 23 and 24, as shown in Figures 1, 2 and 3, there is provided a clevis 28 and a clevis pin 29. The clevis pins of the two bars 23 and 24 are mounted in brackets 30 and 31 which are in turn carried by a frame member 33. The latter is fastened to the vehicle side frame 11 by means of a channel 34 and angular brace 35.

Figures 3 and 4, which are sectional views in the forward direction through the mounting frame, illustrate the manner in which the mowing implement 18 is fastened to the V-shaped mounting frame 22. As shown in these figures the spaced plates 25 and 26 are pierced by a tubular journal 37 which is preferably fastened to the plates by welding. The tubular journal receives the mounting bracket generally designated 38, which comprises a tubular pivot section 39 having an integrally formed flange 40 and a pair of angularly disposed clevis members 42 and 43. As shown in Figure 6 clevis member 42 has an integrally formed extension 44 which is apertured to receive a compression bolt, as hereinafter explained, and clevis member 43 is provided with a similar extension 45 which is apertured to receive a tension bolt. The lower ends of clevis members 42 and 43 are provided respectively with openings 46 and 47 which are aligned along a slightly inclined axis so as to give the mowing implement a slight downward tilt, as shown in Figure 5. These openings receive pivot pins 49 and 40 which receive the inner shoe member 51 of the mowing implement.

In the assembled condition the upper end of the tubular pivot section 39 of the mounting bracket 38 extends above the tubular journal 37 and a collar 52 is attached to the protruding end and held in place by through bolt 53. This serves to prevent mounting bracket 38 from dropping out of the tubular journal when the V-shaped mounting frame 22 is elevated, as hereinafter explained.

While the mowing implement 18 is pivoted for movement about the vertical axis of the tubular journal 37 in mounting frame 22, movement is restrained by a yieldable spring mechanism, shown in Figure 6. Extending downwardly from bar 24 of frame 22 there is a lug 54 which is apertured at its lower end to receive the bolt generally designated 55. The bent end 56 of the bolt protrudes through the aperture in the extension 44 of the clevis member 42 and is held in place by a cotter pin 57. Bolt 55 is threaded throughout the major portion of its length and is provided with a pair of flanged collars 59 which are slidable on the bolt. The collars serve to position compression spring 60, the spring pressure being adjustable by a pair of nuts 61.

Similarly on bar 23 there is provided a lug 63 which extends downwardly, as shown in Figure 4, and is apertured at 64 to receive a bolt generally designated 70. The bent end 71 of bolt 70 protrudes through aperture 64 and is retained in place by a cotter pin 72. At an intermediate portion of the bolt there is welded a collar 74 and the other end of the bolt is threaded, as shown at 75, to receive adjustment nuts 76. Between the collar 74 and lug there is positioned a convex washer 77 which facilitates the seating between the bolt 70 and lug 63. Between lock nuts 76 and lug 63 there are positioned a pair of slidably mounted flanged collars 78 which serve to position spring 79.

The mechanism for yieldably positioning the mowing machine as illustrater herein, and shown particularly in Figure 6, is adjusted by drawing down lock nuts 61 and 76 until each of the springs 60 and 79 are placed under an initial compression. The adjustment is made so that under normal conditions the mowing implement 18 is held in a position substantially transverse of the vehicle. When an obstruction is encountered the mowing instrument yields and assumes a rearward position such as that shown in the dotted line of Figure 1, and springs 60 and 79 are compressed to accommodate the change in position. When the obstruction is removed the springs force the mowing implement 18 to assume its normal position, as shown in the full lines in Fig. 1. The lug 63 is slightly twisted below the aperture 64 and is provided with another opening which receives the clevised end 67 of radius rod 68. The rod 68 extends forwardly and is attached to the front axle by means of bracket 69 as shown in Figure 1.

The V-shaped frame may be supported from the ground by the bottom runner of shoe 51, partially suspended in operating condition by means of a spring 81 or the position is raised or lowered by a mechanism generally designated 82. The mechanism 82 includes a pivot shaft 83 which is mounted on the chassis of the vehicle by means of a pair of pillow blocks 84 and 85, an operating lever 86, detent quadrant 88, and a crank arm 90. The crank arm is connected to the V-shaped mounting frame 22 by means of chain 91 and the detent quadrant cooperates with a pawl 89 (see Figure 3). By varying the position of the operating handle 86 the position of mounting frame 22 may be varied with respect to the chassis of the vehicle and this in turn varies the position of pivot pins 49 and 50 of the mowing implement 18. The adjustment is locked by means of pawl 89, or if shoe 51 is desired to rest upon and follow the undulations of the ground, pawl 89 can be tilted to the left until it rests by gravity out of engagement.

The mowing implement is provided with a mechanism for pivotally lifting mowing implement 18, consisting of a bracket 93 and an operator controlled mechanism generally designated 100. Some of the weight of the mowing implement is carried by spring 96, which is connected to the frame 22 at bracket 97 and to the mowing implement bracket 93 by chain 95 and link 94.

The chain 95 may be adjusted so that spring 96 is tensioned to almost lift the outer end of mowing implement 18 by pivoting it upwardly about pivot pins 49 and 50, the additional force necessary to lift the mowing implement being supplied by spring 81 and by the operator controlled mechanism 100. This mechanism consists of a pivot shaft 101 which is mounted in pillow blocks 102 on the chassis of the vehicle. One end of the shaft 101 is crank-shaped, as shown at 103, and is provided with a foot treadle 105, and the other end is provided with a crank arm 104 to which a cable 106 is attached by means of connector plate 107. A pulley 108 is mounted on bar 24 of the V-shaped frame and the cable 106 passes thereunder and is connected to the upstanding bracket 93 of mowing implement 18. Beneath the crank portion 103 of the operator controlled mechanism there is positioned a second treadle 109 which is mounted intermediate its ends upon a pivot block 110. The treadle has a bent end 111 which is positioned under the crank portion 103 for a purpose to be hereinafter explained.

When the mowing implement 18 is in the raised position the crank 104 and the suspension linkages comprising cable 106 and 107 are moved to an over center position and are accordingly not self-returning. The mechanism is returned when the operator steps upon treadle 109 and forces the bent end 111 upwardly so as to lift the crank 103 of the mechanism. The assembly is rotated backwardly and lowers the mowing implement.

The power drive of the present mechanism is of the type shown and claimed in my Patent 2,060,280 and consists of a drive pulley 17 which is mounted upon the drive shaft 112 of the vehicle propelled mechanism. Upon the frame member 33 there is mounted a bracket generally designated 116 which serves to rotatably support pulley 113 of the lower drive apparatus. The pulley is mounted upon a shaft 114, upon one end of which is mounted a counter-weighted pitman wheel 115.

The bracket 116 also serves to support a pivotally mounted arm 117 which carries an idler wheel 118. The position of the arm 117 is controlled by a mechanism comprising an operator-controlled lever 120 which is pivoted to the channel 34 at point 121. The upper end of the channel 34 carries a plate 122 which is notched as shown in Figure 1, to receive the detent 123 of operating lever 120. Beneath the detent 123 there is a link connection 125 which is pivoted to the operator lever at 126 and to the arm 117 at 127. A belt 130 is provided and is of such a length that the pulley 118 must be depressed to the dotted line position 131 (shown in Figure 3) in order sufficiently to tighten the belt to provide an effective drive between driving pulley 17 and driven pulley 113.

Another effective method for operating shaft 114 is to employ sprockets in place of pulleys 17 and 113, and a chain in place of belt 130. A friction clutch on shaft 114 arranged to engage or disengage the sprocket thereon would replace the belt tightening and loosening mechanism.

The sickle 19 of the mowing implement 18 is provided with a ball joint driving connection as shown at 132 which is adjacent the axis of pivot pins 49 and 50 and also to the axis produced of tubular journal 37. A pitman rod 133 joins the ball joint 132 and the crank pin of the pitman wheel 115 so that as the pitman wheel is revolved the cutter bar 19 is oscillated backward and forward in the mowing implement.

The effect of the vertical pivotal connection of tubular journal 37 and nearly horizontal pivotal connection through the axis of pivot pins 49 and 50 is to provide a universal connection of the mowing implement 18 with respect to the V-shaped mounting frame 22 and hence with respect to the vehicle. The universal movement is restrained by the yieldable spring mechanism shown in detail in Figure 6 so that the mowing implement is only able to move freely in an upright plane at right angles to the axis of pivot pins 49 and 50.

When the machine is placed in operation the operating lever 120 is moved toward the machine and power is accordingly transmitted from the rotating pulley 17 through the driven pulley 113, pitman wheel 115 and pitman rod 133 and the sickle is reciprocated. The machine thus travels with the sickle reciprocating until the cutting implement 18 strikes an obstruction such as a boulder, or the like, at which time it moves backwardly to the dotted line position shown in Figure 1. The time interval during which the cutting implement is moving backwardly relative to the machine is sufficient to allow the operator to throw the vehicle out of gear to stop its forward motion. After backing away the operator steps on treadle 105 and the cutting implement is lifted vertically to an extent which is ordinarily sufficient to clear any obstruction encountered.

It will be noted that the lifting motion of the mowing implement is accomplished by a single stroke of the crank 103 and this may accordingly be accomplished very rapidly. The mowing implement is not raised vertically and hence the cutter bar 19 may continue to reciprocate even in the elevated position. The upward rotation of the cutting implement about the axis of pivot pins 49 and 50 and the backward rotation about the axis of tubular journal 37 does not appreciably affect the connection between the pitman rod 133 and the ball joint 132 of the reciprocating cutter bar since this connection is adjacent the two axes. Such slight deviation of the reciprocatory path of ball joint 132 as will occur while the mowing implement 18 is backwardly deflected will be accomplished without binding in the pitman rod bearing 135 due to the vertically disposed pin joint 134 in the pitman rod adjacent the bearing. Hence the cutting implement may be lifted and moved backwardly at the same time under the influence of the obstruction encountered, all without first interrupting the reciprocation of the cutter bar. This freedom of operation enables the operator to concentrate upon moving the mowing implement so as to clear the obstruction and upon stopping the vehicle.

Many obvious variations may be made in the apparatus herein described and claimed without departing from the spirit of the invention.

I claim as my invention:

1. A mowing machine comprising a traction vehicle, an A-frame having its free ends pivoted to the vehicle for movement in a vertical plane and having the apex thereof extending beyond the side of said vehicle, a substantially upright pivot mounted on the extending apex of said A-frame, a mowing implement mounted for movement about said pivot balance spring, means connecting the A-frame and implement for yieldably retaining the mowing implement in a position transversely of said traction vehicle, and means for raising and lowering said A-frame.

2. A mowing machine comprising a tractor vehicle, an implement frame mounted on said vehicle, a mowing implement, means for universally mounting said implement on the frame, balanced spring means connecting the frame and implement for yieldably restraining the movement of said implement to a plane at right angles to the traction vehicle, and suspension means for maintaining said implement in said plane at a predetermined angle with respect to the implement frame.

3. A mowing machine comprising a traction vehicle, an implement frame mounted on said vehicle, a mowing implement, means for universally mounting said implement on the frame, balanced spring means connecting the frame and the implement for yieldably restraining the movement of said implement to a plane at right angles to the traction vehicle, spring suspension means for maintaining said implement in said plane at an angle with respect to the implement frame, and operator controlled means for raising and lowering said implement frame.

4. A mowing machine comprising a traction vehicle, an implement frame mounted on said vehicle, a mowing implement having a reciprocatory cutter bar, means for universally mounting said implement on the frame balanced spring, means for yieldably restraining the movement of said implement to a plane substantially at right angles to the traction vehicle, suspension means for maintaining said implement at a predetermined angle with respect to the implement frame, a power source on said vehicle, and means including a reciprocatory drive link connecting the power source and reciprocatory cutter bar of the mowing implement.

5. A mowing machine comprising a traction vehicle, an implement frame mounted on said vehicle, a mowing implement having a reciprocatory cutter bar, means for universally mounting said implement on the frame balanced spring, means for yieldably restraining the movement of said implement to a plane substantially at right angles to the traction vehicle suspension means for maintaining said upright implement at a predetermined angle with respect to the implement frame, means including a reciprocatory link for driving said cutter bar, and a universal connection between said link and bar adjacent the universal mounting means of said mowing implement.

6. A mowing machine comprising a traction vehicle, an implement mounting frame pivotally mounted on said vehicle for movement in a vertical plane and having a free end adjacent the outer limits of said vehicle, a mowing implement having a reciprocatory cutter bar, means for universally mounting said implement on the mounting bar, balanced spring means for yieldably restraining the movement of said implement to a plane at right angles to the traction vehicle, suspension means for maintaining said implement at a predetermined angularity with reference to said frame in said plane, a rotary power source on said traction vehicle adjacent the mounting frame pivot and a reciprocating link universally connected at one end to said rotary power source and universally connected at the other end to the reciprocatory cutter bar.

7. A mowing machine comprising a traction vehicle, an implement frame having one of its ends connected to the vehicle, mounted transversely for vertical movement relative to the vehicle, a mowing implement mounted at the free end of the frame for movement in horizontal and vertical planes, and a pair of initially stressed opposed springs coacting between said implement and frame for normally restraining movement of the mowing implement in the horizontal plane.

8. A mowing machine comprising a traction vehicle, an implement frame having one of its ends connected to the vehicle, mounted transversely for vertical movement relative to the vehicle, a mowing implement mounted at the free end of the frame for movement in horizontal and vertical planes, arms on said implement adjacent the frame, said arms being in a horizontal plane and extending forwardly and rearwardly of the implement, and an initially compressed spring between each arm and the frame.

9. A mowing machine comprising a traction vehicle, power means on said vehicle comprising a cutter driving pitman crank, an implement mounting frame connected adjacent to said crank and extended transversely for vertical movement, a mowing implement universally connected to the free end of said frame for movement in a vertical plane, a pair of preloaded springs one balancing the other connecting said frame and implement and adapted to resist backward movements of said implement, a reciprocatory cutter in said implement and having a universal connection adjacent to the said implement connection, and a reciprocatory pitman rod extending from said cutter connection and universally connected to said crank.

10. A mowing machine comprising a traction vehicle, power means on said vehicle adapted for driving a reciprocatory cutter, an implement mounting frame connected adjacent to said driving means and extended transversely, a forwardly extending drawbar link connecting the extended end of said frame with the vehicle and permitting vertical movement, a mowing implement universally connected to the free end of said frame for movement in a plane, transverse to the line of travel, preloaded counterbalanced springs each connecting said frame and implement and adapted to hold the implement in said plane and to resist backward movements thereof, a reciprocatory cutter in said implement, and a cutter driving pitman link universally connecting said cutter and cutter driving means.

JOHN S. CLAPPER.